United States Patent
Wang et al.

(10) Patent No.: US 10,557,035 B2
(45) Date of Patent: Feb. 11, 2020

(54) RESIN COMPOSITION FOR HIGH FREQUENCY ELECTRONIC COMPONENTS

(71) Applicant: SABIC Global Technologies B.V., Bergen op Zoom (NL)

(72) Inventors: Jian Wang, Shanghai (CN); Shijie Song, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 51 days.

(21) Appl. No.: 15/752,908

(22) PCT Filed: Jul. 21, 2016

(86) PCT No.: PCT/IB2016/054356
§ 371 (c)(1),
(2) Date: Feb. 15, 2018

(87) PCT Pub. No.: WO2017/029564
PCT Pub. Date: Feb. 23, 2017

(65) Prior Publication Data
US 2018/0258282 A1    Sep. 13, 2018

Related U.S. Application Data

(60) Provisional application No. 62/207,559, filed on Aug. 20, 2015.

(51) Int. Cl.
*C08L 71/12* (2006.01)
*C08L 25/06* (2006.01)
*C08L 53/02* (2006.01)
*C08K 3/22* (2006.01)
*B29C 48/00* (2019.01)
*C08K 3/014* (2018.01)
*C08K 3/30* (2006.01)

(52) U.S. Cl.
CPC ............ *C08L 71/12* (2013.01); *B29C 48/022* (2019.02); *C08K 3/014* (2018.01); *C08K 3/22* (2013.01); *C08K 3/30* (2013.01); *C08L 25/06* (2013.01); *C08L 53/02* (2013.01); *C08K 2003/2241* (2013.01); *C08L 2203/20* (2013.01)

(58) Field of Classification Search
CPC ........ C08L 71/12; C08L 25/06; C08L 53/025; C08L 53/02
See application file for complete search history.

(56) References Cited

U.S. PATENT DOCUMENTS

| | | | | |
|---|---|---|---|---|
| 4,483,958 | A * | 11/1984 | Kosaka | ............... C08L 25/06 524/409 |
| 5,559,186 | A | 9/1996 | Fuji et al. | |
| 8,187,696 | B2 | 5/2012 | Paul et al. | |
| 8,309,640 | B2 | 11/2012 | Li et al. | |
| 8,461,264 | B2 | 6/2013 | Arai et al. | |
| 2004/0059042 | A1* | 3/2004 | Hartle | ............... C08L 25/06 524/500 |
| 2004/0082719 | A1* | 4/2004 | Adedeji | ............... B29B 7/421 525/89 |
| 2008/0113187 | A1 | 5/2008 | Toyouchi et al. | |
| 2009/0054553 | A1 | 2/2009 | Meng et al. | |
| 2016/0064746 | A1* | 3/2016 | Iino | ............... H01M 4/96 429/468 |

FOREIGN PATENT DOCUMENTS

| | | |
|---|---|---|
| CN | 1484677 A | 3/2004 |
| CN | 1694923 A | 11/2005 |
| EP | 0586985 B1 | 12/1996 |
| KR | 2013-0040238 A | 4/2013 |
| WO | WO 2002/053644 A2 | 7/2002 |
| WO | WO 2012/003148 A2 | 1/2012 |

OTHER PUBLICATIONS

A. Thabet; "Advanced Model for Predicting Dielectric Properties of Nanocomposite Industrial Materials"; Journal of Engineering Sciences; vol. 39 No. 5; Sep. 2011; p. 1055-1068.
Yang et al.; "Preparation of Core-Shell Structured Polystyrene/ BaTiO3 Nanoparticles Via in Situ RAFT Polymerization for High-Performance Dielectric Nanocomposites"; IEEE Int'l Conf. Solid Dielectrics; Jun. 2013; p. 722-725.
International Patent Application No. PCTIB2016/054356; Int'l Search Report and the Written Opinion; dated Oct. 17, 2016; 9 pages.
International Patent Application No. PCTIB2016/054356; Int'l Preliminary Report on Patentability; dated Mar. 1, 2018; 6 pages.

* cited by examiner

*Primary Examiner* — Jeffrey C Mullis
(74) *Attorney, Agent, or Firm* — Baker Hostetler

(57) ABSTRACT

Disclosed are resin compositions that include poly(arylene ether), HIPS/GPPS), impact modifier, and ceramic filer that provide various Dk values while maintaining Df at a very low level. The compositions also possess excellent mechanical and processing performance, for example, superior high impact strength and good ductility, compared to prior art compositions. The compositions can be used to form components of wireless electronic communications devices in order to ensure a low degree of signal attenuation.

19 Claims, No Drawings

RESIN COMPOSITION FOR HIGH FREQUENCY ELECTRONIC COMPONENTS

CROSS-REFERENCE TO RELATED APPLICATIONS

This application is the National Stage of International Application No. PCT/IB2016/054356 filed Jul. 21, 2016, which claims the benefit of U.S. Provisional Application No. 62/207,559 filed Aug. 20, 2015, the disclosures of which are incorporated herein by this reference in their entireties.

TECHNICAL FIELD

The present disclosure pertains to thermoplastic compositions that can be used to manufacture parts for devices that engage in high frequency electronic communication.

BACKGROUND

In the wireless communications industry, plastics have been widely used to produce specialized components such as antenna housings, antenna substrates, or phase shift for electric devices. Plastic itself is a dielectric material, which means all plastic has the capability to store and dissipate a certain amount of energy when electromagnetic waves pass through it. This kind of internal property is defined as the dielectric property and is quantified by two parameters, dielectric constant (Dk) and dissipation factor (Df). Plastics with different Dk levels are desirable to meet different wireless communication component designs, while it is always advantageous for a material to possess as low a Df value as possible in order to eliminate undesired energy loss.

In order to produce plastics with different Dk levels, the relevant thermoplastic material will include a large volume fraction of dielectric filler, such as ceramic filler. Normally, such filler will drop the mechanical and processing performance of plastics, such as decrease the impact strength and lower the flow. Therefore, it is always very challenging to produce a plastic compound with desirable Dk while minimizing the Df and the decline of other mechanical and processing properties.

SUMMARY

The present disclosure pertains to thermoplastic compositions that provide various Dk values while maintaining Df at a very low level. The compositions also possess excellent mechanical and processing performance, for example, superior high impact strength and good ductility, compared to prior art compositions.

Provided herein are resin compositions comprising 40-90% by weight of a poly(arylene ether); 0-40% by weight of high-impact polystyrene (HIPS) and 0-40% by weight of general-purpose polystyrene (GPPS), provided that the HIPS, the GPPS, or the combination thereof represents 5-40% by weight of said composition; 5-25% by weight of an impact modifier; and, 15-400% by weight of a ceramic filler, as measured per 100 parts by weight of the poly(arylene ether, HIPS and/or GPPS, and impact modifier, wherein components (a)-(c) are each expressed relative to the total weight of components (a)-(c).

Also disclosed are plastic components formed from a composition that comprises 40-90% by weight of a poly(arylene ether); 0-40% by weight of high-impact polystyrene (HIPS) and 0-40% by weight of general-purpose polystyrene (GPPS), provided that the HIPS, the GPPS, or the combination thereof represents 5-40% by weight of said composition; 5-25% by weight of an impact modifier; and, 15-400% by weight of a ceramic filler, as measured per 100 parts by weight of the poly(arylene ether, HIPS and/or GPPS, and impact modifier, wherein components (a)-(c) are each expressed relative to the total weight of components (a)-(c).

The present disclosure also pertains to methods of making a resin composition comprising combining together each of the following: 40-90% by weight of a poly(arylene ether); 0-40% by weight of high-impact polystyrene (HIPS) and 0-40% by weight of general-purpose polystyrene (GPPS), provided that the HIPS, the GPPS, or the combination thereof represents 5-40% by weight of said composition; 5-25% by weight of an impact modifier; and, 15-400% by weight of a ceramic filler, as measured per 100 parts by weight of the poly(arylene ether, HIPS and/or GPPS, and impact modifier, wherein components (a)-(c) are each expressed relative to the total weight of components (a)-(c).

Also provided herein are methods of making a plastic component comprising: extruding a resin composition comprising 40-90% by weight of a poly(arylene ether); 0-40% by weight of high-impact polystyrene (HIPS) and 0-40% by weight of general-purpose polystyrene (GPPS), provided that the HIPS, the GPPS, or the combination thereof represents 5-40% by weight of said composition; 5-25% by weight of an impact modifier; and, 15-400% by weight of a ceramic filler, as measured per 100 parts by weight of the poly(arylene ether, HIPS and/or GPPS, and impact modifier, wherein components (a)-(c) are each expressed relative to the total weight of components (a)-(c), and, molding the extruded composition to form the component.

DETAILED DESCRIPTION OF ILLUSTRATIVE EMBODIMENTS

It is to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural equivalents unless the context clearly dictates otherwise. Thus, for example, reference to "a polycarbonate polymer" includes mixtures of two or more polycarbonate polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent "about", it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves, methods for preparing such compositions, and items made from the compositions. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt. %," and "wt. %" of a component, which can be used interchangeably, unless specifically stated to the contrary, are based on the total weight of the formulation or composition in which the component is included. For example if a particular element or component in a composition or article is said to have 8% by weight, it is understood that this percentage is relative to a total compositional percentage of 100% by weight.

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

All cited patents, patent applications, and other references are incorporated herein by reference in their entirety.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

Provided herein are resin compositions comprising 40-90% by weight of a poly(arylene ether); 0-40% by weight of high-impact polystyrene (HIPS) and 0-40% by weight of general-purpose polystyrene (GPPS), provided that the HIPS, the GPPS, or the combination thereof represents 5-40% by weight of said composition; 5-25% by weight of an impact modifier; and, 15-400% by weight of a ceramic filler, as measured per 100 parts by weight of the poly(arylene ether), HIPS and/or GPPS, and impact modifier, wherein components (a)-(c) are each expressed relative to the total weight of components (a)-(c).

The present disclosure pertains to thermoplastic compositions that provide various Dk values while maintaining Df at a low level. The compositions also possess excellent mechanical and processing performance, for example, superior high impact strength and good ductility, compared to prior art compositions. Conventional thermoplastic compositions for use in the manufacture of parts for devices that engage in high frequency electronic communication have variable dialectric properties, and while it is possible to produce compositions that can be manipulated so that they respectively possess different dialectric constant values (Dk), it has traditionally been difficult to maintain acceptable values for dissipation factor (Df) in these compositions, such that undesired energy loss has remained an ongoing problem. The present inventors have identified thermoplastic compositions whose dialectric properties include desirable Dk values and low Df values, and that possess superior processing and mechanical characteristics such as good flowability, high ductility, and high impact strength.

Poly(Arylene Ether)

The term poly(arylene ether)polymer includes polyphenylene ether (PPE) and poly(arylene ether)copolymers; graft copolymers; poly(arylene ether)ionomers; and block copolymers of alkenyl aromatic compounds with poly(arylene ether)s, vinyl aromatic compounds, and poly(arylene ether), and the like; and combinations including at least one of the foregoing. Poly(arylene ether)polymers per se, are polymers including a plurality of polymer precursors having structural units of the formula (I):

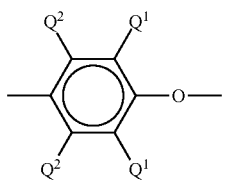
(I)

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially C14 alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction with the hydroxy groups of two poly(arylene ether) chains to produce a higher molecular weight polymer. Poly(arylene ether)s further include combinations including at least one of the above.

The poly(arylene ether) may have a number average molecular weight of about 3,000 to about 30,000 g/mole and a weight average molecular weight of about 30,000 to about 60,000 g/mole, as determined by gel permeation chromatography. The poly(arylene ether) can have an intrinsic viscosity of 0.30 to 0.50 deciliters per gram (dL/g), or 0.4 to 0.46 dL/g, as measured in chloroform at 25° C. It is also possible to utilize a combination of two or more poly(arylene ether) components that respectively have different intrinsic viscosities. Determining an exact ratio, when two intrinsic viscosities are used, will depend somewhat on the exact intrinsic viscosities of the poly(arylene ether) used and the ultimate physical properties that are desired.

The poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes are those which include molecules having at least one aminoalkyl-containing end group. The aminoalkyl radical is typically located in an ortho position to the hydroxy group. Products containing such end groups can be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, can contain at least one of the aminoalkyl-containing and 4-hydroxybiphenyl end groups.

In some embodiments of the present compositions, the poly(arylene ether) resin is poly(p-phenylene oxide).

The poly(arylene ether) resin may be present in the inventive composition in an amount of 40-90% by weight. In some embodiments, the poly(arylene ether) resin is present in an amount of 40-80% by weight, 40-65% by weight, 50-75% by weight, or 40-60% by weight, for example, in an amount of about 40% by weight, about 42% by weight, about 44% by weight, about 46% by weight, about 47% by weight, about 48% by weight, about 49% by weight, about 50% by weight, about 51% by weight, about 52% by weight, about 53% by weight, about 54% by weight, about 55% by weight, about 56% by weight, about 57% by weight, about 58% by weight, about 59% by weight, about 60% by weight, about 61% by weight, about 62% by weight, about 63% by weight, about 64% by weight, or about 65% by weight. In any of the preceding embodiments, the poly(arylene ether) resin may be, for example, poly(p-phenylene oxide).

Polystyrene Components

The polystyrene components of the present compositions include 0-40% by weight of high-impact polystyrene (HIPS) and 0-40% by weight of general-purpose polystyrene (GPPS), provided that the HIPS, the GPPS, or the combination thereof represents 5-40% by weight of the respective compositions. For example, HIPS may be present in the present compositions in an amount of 5-40% by weight, 5-35% by weight, 10-30% by weight, 5-30% by weight, 5-25% by weight, 5-20% by weight, 5-15% by weight, 5-10% by weight, such as about 5% by weight, about 6% by weight, about 7% by weight, about 8% by weight, about 9% by weight, about 10% by weight, about 11% by weight, about 12% by weight, about 13%, about 14% by weight, about 15% by weight, about 17% by weight about 19% by weight, about 20% by weight, about 22% by weight, about 24% by weight, about 25% by weight, about 27% by weight, about 29% by weight, about 30% by weight, about 32% by weight, about 34% by weight, about 35% by weight, about 37% by weight, about 38% by weight, or about 40% by weight. In any of these embodiments, GPPS may also be present, subject to the general limitation that the total weight percentage of HIPS+GPPS is 5-40% by weight of a given composition. Alternatively, in any of these embodiments, GPPS may be absent.

GPPS may be present in the present compositions in an amount of 5-40% by weight, 5-35% by weight, 10-30% by weight, 5-30% by weight, 5-25% by weight, 5-20% by weight, 5-15% by weight, 5-10% by weight, such as about 5% by weight, about 6% by weight, about 7% by weight, about 8% by weight, about 9% by weight, about 10% by weight, about 11% by weight, about 12% by weight, about 13%, about 14% by weight, about 15% by weight, about 17% by weight about 19% by weight, about 20% by weight, about 22% by weight, about 24% by weight, about 25% by weight, about 27% by weight, about 29% by weight, about 30% by weight, about 32% by weight, about 34% by weight, about 35% by weight, about 37% by weight, about 38% by weight, or about 40% by weight. In any of these embodiments, HIPS may also be present, subject to the general limitation that the total weight percentage of HIPS+GPPS is 5-40% by weight of a given composition. Alternatively, in any of these embodiments, HIPS may be absent.

Impact Modifier

Impact modifiers may be high molecular weight elastomeric materials derived from olefins, monovinyl aromatic monomers, acrylic and methacrylic acids and their ester derivatives, as well as conjugated dienes that are fully or partially hydrogenated. The elastomeric materials can be in the form of homopolymers or copolymers, including random, block, radial block, graft, and core-shell copolymers.

A specific type of impact modifier may be an elastomer-modified graft copolymer comprising (i) an elastomeric (i.e., rubbery) polymer substrate having a Tg less than about 10° C., less than about 0° C., less than about −10° C., or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_1$-$C_8$ alkyl(meth)acrylates; elastomeric copolymers of $C_1$-$C_8$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), styrene ethylene propylene styrene (SEPS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). An exemplary SEBS impact modifier is high flow SEBS with a melt flow index that is greater than 3 g/10 min at 230° C./5 kg.

Impact modifiers may be included in the present composition in the amount of 5-25% by weight. For example, the impact modifier may be present in the amount of 7-20% by weight, 8-16% by weight, 9-15% by weight, or 9-12% by weight, for example, in the amount of about 5% by weight, about 6% by weight, about 7% by weight, about 8% by weight, about 9% by weight, about 10% by weight, about 11% by weight, about 12% by weight, about 13% by weight, about 14% by weight, about 15% by weight, about 16% by weight, about 17% by weight, about 18% by weight, about 19% by weight, about 20% by weight, about 21% by weight, about 22% by weight, about 23% by weight, about 24% by weight, or about 25% by weight.

Filler

The present compositions include a ceramic filler. Such fillers may include, for example, molybdenum sulfide, zinc sulfide, barium titanate, calcium titanate, barium ferrite, barium sulfate, heavy spar, $TiO_2$, aluminum oxide, or magnesium oxide. A preferred ceramic filler is $TiO_2$. The present inventors have surprisingly discovered that ceramic fillers can be used in the present compositions in higher levels than are conventionally used in order to produce materials that have desired (e.g., high) Dk levels while maintaining favorably low Df levels. Although it was previously known that the amount of fillers in compositions used for making components of devices used in electronic communication could be increased in order to raise Dk levels, it was believed that doing so would result in unfavorably high Df levels. Thus, it was not typically the case that ceramic fillers were included in resin compositions for electronic communications device components in excess of about 20% by weight relative to 100 parts by weight of the other contents of the resin compositions. In the present compositions, however, it is possible to use ceramic fillers in the amount of 15 to 400% by weight per 100 parts by weight of the poly(arylene ether), HIPS/GPPS, and impact modifier components, while still maintaining desirably low Df levels, and also while maintaining good mechanical characteristics, including impact rating and thermal performance. In a preferred embodiment, the ceramic filler is present in the amount of 20% to 200% by weight, 40% to 200% by weight, more than 20% by weight, more than 40% by weight, more than 60% by weight, more than 80% by weight, or more than 100% by weight, e.g., 100% to 400% by weight, per 100 parts by weight of the poly(arylene ether), HIPS/GPPS, and impact modifier components. For example, the ceramic filler component may be present in the amount of about 15%, about 17%, about 20%, about 25%, about 30%, about 40%, about 50%, about 60%, about 70%, about 80%, about 90%, about 100%, about 110%, about 120%, about 140%, about 160%, about 180%, about 200%, about 220%, about 240%, about 260%, about 280%, about 300%, about 320%, about 340%, about 360%, about 380%, or about 400% by weight per 100 parts by weight of the poly(arylene ether), HIPS/GPPS, and impact modifier components.

Additives

The composition can include various additives ordinarily incorporated into polymer compositions of this type, with the proviso that the additive(s) are selected so as to not significantly adversely affect the desired properties of the thermoplastic composition (good compatibility for example). Such additives can be mixed at a suitable time during the mixing of the components for forming the composition. The total amount of all of the additives in the resin composition can be, for example, 0.001 to 12 wt % each based on the total weight of the composition.

The additive composition can include a flow modifier, reinforcing agent, antioxidant, heat stabilizer, light stabilizer, ultraviolet light stabilizer, ultraviolet absorbing additive, plasticizer, lubricant, release agent, antistatic agent, anti-fog agent, antimicrobial agent, chain extender, colorant, de-molding agents, flow promoter, flow modifier, surface effect additive, radiation stabilizer, flame retardant, anti-drip agent, or any combination thereof.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate available as IRGAPHOS™ 168. Heat stabilizers are generally used in amounts of 0.01 to 5 wt %, based on the total weight of polymer in the composition.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g., alkyl stearyl esters, such as, methyl stearate, stearyl stearate, and the like), waxes (e.g., beeswax, montan wax, paraffin wax, or the like), or combinations comprising at least one of the foregoing plasticizers, lubricants, and mold release agents. These are generally used in amounts of 0.01 to 5 wt %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis (4H-3,1-benzoxazin-4-one, commercially available under the trade name CYASORB® UV-3638 from Cytec Industries Inc., Woodland, N.J.), aryl salicylates, hydroxybenzotriazoles (e.g., 2-(2-hydroxy-5-methylphenyl)benzotriazole, 2-(2-hydroxy-5-tert-octylphenyObenzotriazole, and 2-(2H-benzotriazol-2-yl)-4-(1,1,3,3-tetramethylbutyl)-phenol, commercially available under the trade name CYASORB® 5411 from Cytec Industries Inc., Woodland, N.J.) or combinations comprising at least one of the foregoing light stabilizers. The UV stabilizers can be present in an amount of 0.01 to 1 wt %, specifically, 0.1 to 0.5 wt %, and more specifically, 0.15 to 0.4 wt %, based upon the total weight of polymer in the composition.

Antioxidant additives include organophosphites such as tris(nonyl phenyl)phosphate, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Inorganic flame retardants can also be used, for example salts of C1-16 alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. A TSAN comprises 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Antidrip agents can be used in amounts of 0.1 to 10 parts by weight, based on 100 parts by weight of the total composition, excluding any filler.

The present disclosure also relates to methods for making a resin composition comprising combining (a) 40-90% by weight of a poly(arylene ether); (b) 0-40% by weight of high-impact polystyrene (HIPS) and 0-40% by weight of general-purpose polystyrene (GPPS), provided that the HIPS, the GPPS, or the combination thereof represents 5-40% by weight of said composition; (c) 5-25% by weight of an impact modifier; and, (d) 15-400% by weight of a ceramic filler, as measured per 100 parts by weight of components (a)-(c). For example, the combining may be performed extruding the specified components.

The resin compositions can be formed by techniques known to those skilled in the art. Extrusion and mixing techniques, for example, may be utilized to combine the components of the resin composition.

The resin compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods, including batch or continuous techniques that employ kneaders, extruders, mixers, and the like. For example, the composition can be formed as a melt blend employing a twin-screw extruder. In some embodiments at least some of the components are added sequentially. For example, the poly(arylene ether) component, the polystyrene component(s), and the impact modifier component can be added to the extruder at the feed throat or in feeding sections adjacent to the feed throat, or in feeding sections adjacent to the feed throat, while the filler component can be added to the extruder in a subsequent feeding section downstream. Alternatively, the sequential addition of the components may be accomplished through multiple extrusions. A composition may be made by preextrusion of selected components, such as the poly(arylene ether) component, the polystyrene component(s), and the impact modifier component to produce a pelletized mixture. A second extrusion can then be employed to combine the preextruded components with the remaining components. The filler component can be added as part of a masterbatch or directly. The extruder can be a two lobe or three lobe twin screw extruder.

In one aspect, the present disclosure pertains to plastic components, for example, that have been shaped, formed, or molded at least in part from the compositions described herein. Also provided are plastic components comprising a resin composition that is formed according to the presently disclosed methods for forming a resin composition.

The present disclosure also provides methods of making a plastic component comprising extruding a resin composition comprising (a) 40-90% by weight of a poly(arylene ether); (b) 0-40% by weight of high-impact polystyrene (HIPS) and 0-40% by weight of general-purpose polystyrene (GPPS), provided that the HIPS, the GPPS, or the combination thereof represents 5-40% by weight of said composition; (c) 5-25% by weight of an impact modifier; and, (d) 15-400% by weight of a ceramic filler, as measured per 100 parts by weight of components (a)-(c), wherein components (a)-(c) are each expressed relative to the total weight of components (a)-(c); and, molding the extruded composition to form the component.

The instant compositions can be molded into useful shaped components and articles by a variety of means such as injection molding, extrusion, rotational molding, blow molding and thermoforming to form the components and articles. The compositions described herein can also be made into film and sheet as well as components of laminate systems.

In a further aspect, the components comprising the disclosed compositions may be present in a device used for wireless electronic communication. For example, the components may represent computer and business machine housings such as housings for monitors, handheld electronic device housings such as housings for cell phones, antenna coatings, covers, sheaths, or housings, electrical connectors, and medical devices that utilize electronic communication, or any other device that utilizes wireless electronic communication. Other representative articles that may be fabricated using the disclosed copolymer compositions provided herein include parts for automatic teller machines (ATM); enclosures, computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; and like applications.

Aspects

In various aspects, the present disclosure pertains to and includes at least the following aspects.

Aspect 1. A resin composition comprising: (a) 40-90% by weight of a poly(arylene ether); (b) 0-40% by weight of high-impact polystyrene (HIPS) and 0-40% by weight of general-purpose polystyrene (GPPS), provided that the HIPS, the GPPS, or the combination thereof represents 5-40% by weight of said composition; (c) 5-25% by weight of an impact modifier; and, (d) 15-400% by weight of a ceramic filler, as measured per 100 parts by weight of components (a)-(c), wherein components (a)-(c) are each expressed relative to the total weight of components (a)-(c).

Aspect 2. The resin composition according to aspect 1 wherein the poly(arylene ether) is poly(p-phenylene oxide).

Aspect 3. The resin composition according to aspects 1 or 2 comprising 40-80% by weight of the poly(arylene ether).

Aspect 4. The resin composition according to any one of aspects 1-3 comprising about 50-75% by weight of the poly(arylene ether).

Aspect 5. The resin composition according to any one of aspects 1-4 comprising no HIPS.

Aspect 6. The resin composition according to aspect 5 comprising 10-30% by weight of GPPS.

Aspect 7. The resin composition according any one of aspects 1-4 comprising no GPPS.

Aspect 8. The resin composition according to aspect 7 comprising 10-30% by weight of HIPS.

Aspect 9. The resin composition according to any one of the preceding aspects wherein said impact modifier is styrene ethylene butylene styrene (SEBS), poly(styrene-butadiene-styrene) (SBS), or styrene ethylene propylene styrene (SEPS), or a mixture thereof.

Aspect 10. The resin composition according to any one of the preceding aspects wherein said impact modifier is SEBS.

Aspect 11. The resin composition according to aspect 10 comprising high flow SEBS with a melt flow index that is greater than 3 g/10 min at 230° C./5 kg.

Aspect 12. The resin composition according to any one of the preceding aspects comprising 7-20% of the impact modifier.

Aspect 13. The resin composition according to any one of the preceding aspects comprising 20-200% by weight of a ceramic filler, as measured per 100 parts by weight of components (a)-(c).

Aspect 14. The resin composition according to any one of the preceding aspects comprising 40-200% by weight of a ceramic filler, as measured per 100 parts by weight of components (a)-(c).

Aspect 15. The resin composition according to any one of the preceding aspects wherein the ceramic filler is $TiO_2$, ZnS, $BaTiO_3$, or $CaTiO_3$.

Aspect 16. The resin composition according to any one of the preceding aspects wherein the ceramic filler is $TiO_2$.

Aspect 17. The resin composition according to any one of the preceding aspects, further comprising a flow modifier, reinforcing agent, antioxidant, heat stabilizer, light stabilizer, ultraviolet light stabilizer, ultraviolet absorbing additive, plasticizer, lubricant, release agent, antistatic agent, anti-fog agent, antimicrobial agent, chain extender, colorant, de-molding agents, flow promoter, flow modifier, surface effect additive, radiation stabilizer, flame retardant, anti-drip agent, or any combination thereof.

Aspect 18. The resin composition according to any one of the preceding aspects wherein said poly(arylene ether) has an intrinsic viscosity of 0.3-0.5 dL/g.

Aspect 19. The resin composition according to any one of the preceding aspects wherein said poly(arylene ether) has an intrinsic viscosity of 0.4-0.46 dL/g.

Aspect 20. A plastic component formed from a composition that comprises (a) 40-90% by weight of a poly(arylene ether); (b) 0-40% by weight of high-impact polystyrene (HIPS) and 0-40% by weight of general-purpose polystyrene (GPPS), provided that the HIPS, the GPPS, or the combination thereof represents 5-40% by weight of said composition; (c) 5-25% by weight of an impact modifier; and, (d) 15-400% by weight of a ceramic filler, as measured per 100 parts by weight of components (a)-(c), wherein components (a)-(c) are each expressed relative to the total weight of components (a)-(c).

Aspect 21. The component according to aspect 20, wherein said component is present in a device used for wireless electronic communication.

Aspect 22. A method of making a resin composition comprising combining together each of the following: (a) 40-90% by weight of a poly(arylene ether); (b) 0-40% by weight of high-impact polystyrene (HIPS) and 0-40% by weight of general-purpose polystyrene (GPPS), provided that the HIPS, the GPPS, or the combination thereof represents 5-40% by weight of said composition; (c) 5-25% by weight of an impact modifier; and, (d) 15-400% by weight of a ceramic filler, as measured per 100 parts by weight of components (a)-(c), wherein components (a)-(c) are each expressed relative to the total weight of components (a)-(c).

Aspect 23. The method according to aspect 22, wherein the combining is performed using an extruder.

Aspect 24. A method of making a plastic component comprising extruding a resin composition comprising (a) 40-90% by weight of a poly(arylene ether); (b) 0-40% by weight of high-impact polystyrene (HIPS) and 0-40% by weight of general-purpose polystyrene (GPPS), provided that the HIPS, the GPPS, or the combination thereof represents 5-40% by weight of said composition; (c) 5-25% by weight of an impact modifier; and, (d) 15-400% by weight of a ceramic filler, as measured per 100 parts by weight of components (a)-(c), wherein components (a)-(c) are each expressed relative to the total weight of components (a)-(c); and, molding the extruded composition to form the component.

EXAMPLES

The following examples are set forth so as to provide those of ordinary skill in the art with a complete disclosure and description of how the methods, compositions, and components claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is expressed in degrees Celsius or Fahrenheit, or is at ambient temperature, and pressure is at or near atmospheric.

Example 1—Comparative Results for Physical and Electrical Properties

Materials and Methods

For the data discussed herein the following materials and methods were used. Table 1 lists the extrusion profile of the tested resin compositions. Table 2 lists the molding profile of the resin compositions.

TABLE 1

| Parameters | Unit | PPO based composition |
| --- | --- | --- |
| Compounder Type | NONE | TEM-37BS |
| Barrel Size | mm | 1500 |

TABLE 1-continued

| Parameters | Unit | PPO based composition |
| --- | --- | --- |
| Die | mm | 4 |
| Feed (Zone 0) Temp | NONE | 50 |
| Zone 1 Temp | ° C. | 90 |
| Zone 2 Temp | ° C. | 150 |
| Zone 3 Temp | ° C. | 270 |
| Zone 4 Temp | ° C. | 270 |
| Zone 5 Temp | ° C. | 280 |
| Zone 6 Temp | ° C. | 280 |
| Zone 7 Temp | ° C. | 280 |
| Zone 8 Temp | ° C. | 300 |
| Zone 9 Temp | ° C. | 290 |
| Zone 10 Temp | ° C. | 290 |
| Zone 11 Temp | ° C. | 290 |
| Die Temp | ° C. | 290 |
| Screw speed | rpm | 300 |
| Throughput | kg/hr | 35 |
| Torque | NONE | 50-60 |
| Vacuum 1 | MPa | −0.08 |
| Side Feeder 1 speed | rpm | 250 |
| Melt temperature | NONE | 285 |

TABLE 2

| Parameters | Unit | PPO based composition |
| --- | --- | --- |
| Cnd: Pre-drying time | Hour | 3 |
| Cnd: Pre-drying temp | ° C. | 105 |
| Molding Machine | NONE | FANUC, ES3000 |
| Mold Type (insert) | NONE | ASTM tensile, ASTM flexual, ASTM Izod, ISO Izod, 150 mm × 150 mm × 2.0 mm plaque |
| Hopper temp | ° C. | 50 |
| Zone 1 temp | ° C. | 280-290 |
| Zone 2 temp | ° C. | 290-300 |
| Zone 3 temp | ° C. | 300-310 |
| Nozzle temp | ° C. | 290-300 |
| Mold temp | ° C. | 90-120 |
| Screw speed | rpm | 100 |
| Back pressure | kgf/cm$^2$ | 90 |
| Cooling time | s | 15-20 |
| Injection speed | mm/s | 50-150 |
| Holding pressure | kgf/cm$^2$ | 600-1100 |
| Max. Injection pressure | kgf/cm$^2$ | 1000-1500 |

Compositions with desirable Dk, low Df properties were developed using poly(arylene ether), impact modifier, polystyrene, and ceramic filler as building blocks. Table 3 lists one set of experimental and control formulations that were formed pursuant to the instant investigation. Numbers are expressed in terms of percentage. The experimental formulations are labeled E1.1 to E1.5, respectively. The control formulas, which represent conventional high Dk materials based on poly(p-phenylene oxide) (PPO), high-impact polystyrene (HIPS), TiO2, and BaTiO3, are shown as compositions C1.1 to C1.4.

The ceramic filler component was present in the experimental resin compositions (E1.1-E1.5) in the amount of 15-400% by weight, as measured per 100 parts by weight of the poly(arylene ether), polystyrene, and impact modifier components. Thus, in Table 3, the total amount of the poly(arylene ether), polystyrene, and impact modifier components is set to 100% by weight, and the filler component is expressed in percentage by weight relative to 100 parts by weight of the poly(arylene ether), polystyrene, and impact

TABLE 3

| Item Code | Item Description | C1.1 | C1.2 | C1.3 | C1.4 | E1.1 | E1.2 | E1.3 | E1.4 | E1.5 |
|---|---|---|---|---|---|---|---|---|---|---|
| C2020 | PPO, .40IV, LOW ODOR | 74.2 | 74.1 | 73.4 | 49 | 74.2 | 74.1 | 73.4 | 49 | 43 |
| F5230 | Low Mw SEBS IMPACT MODIFIER | | | | | 12.3 | 12.3 | 12.5 | 17 | 17 |
| L3190 | PS HIPS | 25.8 | 25.9 | 26.6 | 51 | 13.5 | 13.6 | 14.1 | 34 | 40 |
| R10834 | Bright White TiO2 Pigment | 7.5 | 11.5 | 18 | 61 | 21 | 34 | 54 | 182 | 305 |
| 530006 | Tetragonalit barium titanate | | | | | | 13.5 | 22.5 | 36 | 121 |
| F00873 | MAG OXIDE | 0.1 | 0.1 | 0.1 | 0.1 | 0.1 | 0.1 | 0.1 | 0.1 | 0.1 |
| F112 | ZINC SULFIDE | 0.1 | 0.1 | 0.1 | 0.1 | 0.1 | 0.1 | 0.1 | 0.1 | 0.1 |
| F5330 | TDP ANTI-OXIDE | 0.4 | 0.4 | 0.4 | 0.4 | 0.4 | 0.4 | 0.4 | 0.4 | 0.4 |
| ACE-PE | LDPE | 1 | 1 | 1 | 1 | 1 | 1 | 1 | 1 | 1 |

Physical and electrical properties of the control and experimental compositions of Table 3 are listed in Table 4 (control) and Table 5 (experimental), below.

TABLE 4

| Typical Property | Test Method | Test Description | Unit | C1.1 | C1.2 | C1.3 | C1.4 |
|---|---|---|---|---|---|---|---|
| MVR | 300° C./5 kg/360 s | ASTM D1238 | $cm^3$/10 min | 7.5 | 7.0 | 5.7 | 5.8 |
| Notched IZOD | 23° C., 5 lbf/ft | ASTM D256 | J/m | 85 | 82 | 78 | 55 |
| Ductility | 23° C., 5 lbf/ft | ASTM D256 | % | 0 | 0 | 0 | 0 |
| Notched IZOD | −20° C., 5 lbf/ft | ASTM D256 | J/m | 79 | 67 | 65 | 49 |
| HDT | 1.82 MPa/3.2 mm | ASTM D648 | ° C. | 150 | 151 | 150 | 132 |
| Flexural Modulus | 3.2 mm, 1.27 mm/min | ASTM D790 | MPa | 2620 | 2760 | 3000 | 4590 |
| Flexural Strength | break, 3.2 mm, 1.27 mm/min | ASTM D790 | MPa | 104 | 106 | 109 | 108 |
| Tensile Modulus | 50 mm/min | ASTM D638 | MPa | 2716 | 2885 | 3169 | 5094 |
| Tensile Strength | break, 50 mm/min | ASTM D638 | MPa | 58 | 59 | 64 | 66 |
| Tensile Elongation | break, 50 mm/min | ASTM D638 | % | 15.8 | 11.1 | 9.2 | 2.3 |
| Dk | 1.1 GHz | In-house method* | | 3.12 | 3.33 | 3.72 | 7.28 |
| Df | 1.1 GHz | In-house method* | | 1.5e−3 | 1.9e−3 | 2.1e−3 | 4.1e−3 |
| Dk | 1.9 GHz | In-house method* | | 3.13 | 3.34 | 3.73 | 7.32 |
| Df | 1.9 GHz | In-house method* | | 1.8e−3 | 2.2e−3 | 2.6e−3 | 4.9e−3 |

*In-house testing method was as follows. Dk and Df were measured using internal method with QWED split post dielectric resonator and Agilent network analyzer. For 1.1 GHz measurement, minimum sample size is 120 mm × 120 mm, maximum sample thickness is 6 mm. For 1.9 GHz measurement, minimum sample size is 70 mm × 70 mm, maximum sample thickness is 4 mm. Thus, the test samples were prepared from injection molding and had a size of 150 mm × 150 mm × 2.0 mm.

TABLE 5

| Typical Property | Test Method | Test Description | Unit | E1.1 | E1.2 | E1.3 | E1.4 | E1.5 |
|---|---|---|---|---|---|---|---|---|
| MVR | 300° C./5 kg/360 s | ASTM D1238 | $cm^3$/10 min | 7.3 | 6.5 | 5.0 | 2.3 | 0.5 |
| Notched IZOD | 23° C., 5 lbf/ft | ASTM D256 | J/m | 293 | 255 | 186 | 85 | 53 |
| Ductility | 23° C., 5 lbf/ft | ASTM D256 | % | 100 | 100 | 100 | 0 | 0 |
| Notched IZOD | −20° C., 5 lbf/ft | ASTM D256 | J/m | 198 | 170 | 162 | 87 | 53 |
| HDT | 1.82 MPa/3.2 mm | ASTM D648 | ° C. | 151 | 153 | 155 | 137 | 135 |
| Flexural Modulus | 3.2 mm, 1.27 mm/min | ASTM D790 | MPa | 1980 | 2100 | 2290 | 4110 | 7050 |
| Flexural Strength | break, 3.2 mm, 1.27 mm/min | ASTM D790 | MPa | 79 | 79 | 79 | 80 | 60 |
| Tensile Modulus | 50 mm/min | ASTM D638 | MPa | 2121 | 2287 | 2492 | 4596 | 7353 |

TABLE 5-continued

| Typical Property | Test Method | Test Description | Unit | E1.1 | E1.2 | E1.3 | E1.4 | E1.5 |
|---|---|---|---|---|---|---|---|---|
| Tensile Strength | break, 50 mm/min | ASTM D638 | MPa | 49 | 48 | 48 | 47 | 53 |
| Tensile Elongation | break, 50 mm/min | ASTM D638 | % | 26.5 | 17.9 | 11.3 | 2.7 | 0.9 |
| Dk | 1.1 GHz | In-house method* | | 3.00 | 3.29 | 3.76 | 7.15 | 9.71 |
| Df | 1.1 GHz | In-house method* | | 1.1e−3 | 1.2e−3 | 1.2e−3 | 1.2e−3 | 1.1e−3 |
| Dk | 1.9 GHz | In-house method* | | 2.99 | 3.30 | 3.76 | 7.17 | 9.76 |
| Df | 1.9 GHz | In-house method* | | 1.3e−3 | 1.4e−3 | 1.4e−3 | 1.3e−3 | 1.2e−3 |

*As described above in connection with Table 4.

As shown in Table 4, the Df values of control compositions C1.1-C1.4 increase as Dk increases. When Dk increased from ~3 to ~7 at 1.1 GHz, Df increased from 0.0015 to 0.0041.

In the experimental compositions E1.1-E1.5, the Df values were considerably lower (about 0.0011), and, importantly, this was the case even when Dk increased from ~3 to ~7, or higher (Dk 9.7 in E1.5). Moreover, the impact strength and ductility of the experimental solutions were much better than the conventional compositions. Taking the composition having a Dk value of ~3.3 (E1.2) as an example, the notched Izod impact rating at room temperature was as high as 255 J/m, much higher than that of the most closely comparable control composition (C1.2, having an impact rating of 82 J/m). Meanwhile, the ductility of experimental composition E1.2 was 100%, thereby representing a favorable result. The impact performance at low temperature was also good. The notched Izod impact rating of experimental composition E1.2 at −20° C. was 170 J/m.

Table 6, below, lists additional control and experimental compositions. In certain of the experimental compositions, GPPS was used to replace HIPS (E2.1 to E2.3). The control compositions include HIPS as the flow promoter and impact modifier, and are shown as compositions C2.1 and C2.2. The total amount of the poly(arylene ether), polystyrene, and impact modifier components is set to 100% by weight, and the filler component is expressed in percentage by weight relative to 100 parts by weight of the poly(arylene ether), polystyrene, and impact modifier components.

TABLE 6

| Item Code | Item Description | Unit | C2.1 | C2.2 | E2.1 | E2.2 | E2.3 |
|---|---|---|---|---|---|---|---|
| C2000 | PPO, .46IV | % | | 67.3 | | | 67.3 |
| C2020 | PPO, .40IV, LOW ODOR | % | 75.4 | | 75.4 | 66.8 | |
| F5230 | Low Mw SEBS IMPACT MODIFIER | % | 12.3 | | 12.3 | 12.3 | 10.9 |
| L3190 | PS HIPS | % | 12.3 | 32.7 | | | |
| CR3500 | GPPS | % | | | 12.3 | 20.9 | 21.8 |
| R10834 | Bright White TiO2 PIGMENT | % | 21 | 34 | 21 | 21 | 34 |
| F00873 | MAG OXIDE | % | 0.1 | 0.1 | 0.1 | 0.1 | 0.1 |
| F112 | ZINC SULFIDE | % | 0.1 | 0.1 | 0.1 | 0.1 | 0.1 |
| F5330 | TDP ANTI-OXIDE | % | 0.4 | 0.4 | 0.4 | 0.4 | 0.4 |
| ACE-PE | LDPE | % | 1 | 1 | 1 | 1 | 1 |

Physical and electrical properties of the tested control compositions are listed in Table 7, below, and properties of the experimental compositions are listed in Table 8.

TABLE 7

| Typical Property | Test Method | Test Description | Unit | C2.1 | C2.2 |
|---|---|---|---|---|---|
| MVR | 300° C./5 kg/360 s | ASTM D1238 | cm³/10 min | 7.2 | 5.3 |
| Notched IZOD | 23° C., 5 lbf/ft | ASTM D256 | J/m | 338 | 120 |
| Ductility | 23° C., 5 lbf/ft | ASTM D256 | % | 100 | 0 |
| Notched IZOD | −20° C., 5 lbf/ft | ASTM D256 | J/m | 205 | |
| HDT | 1.82 MPa/3.2 mm | ASTM D648 | ° C. | 158 | 143 |
| Flexural Modulus | 3.2 mm, 1.27 mm/min | ASTM D790 | MPa | 2080 | 2930 |
| Flexural Strength | break, 3.2 mm, 1.27 mm/min | ASTM D790 | MPa | 79 | 106 |
| Tensile Modulus | 50 mm/min | ASTM D638 | MPa | 2166 | 2999 |
| Tensile Strength | yield, 50 mm/min | ASTM D638 | MPa | 51 | 67 |
| Tensile Elongation | break, 50 mm/min | ASTM D638 | % | 27.4 | 22.7 |
| Dk | 1.1 GHz | In-house method* | | 3.02 | 3.36 |
| Df | 1.1 GHz | In-house method* | | 1.14e−3 | 1.07e−3 |

*As described above in connection with Table 4.

TABLE 8

| Typical Property | Test Method | Test Description | Unit | E2.1 | E2.2 | E2.3 |
|---|---|---|---|---|---|---|
| MVR | 300° C./5 kg/360 s | ASTM D1238 | cm³/10 min | 9.5 | 14.9 | 8.9 |
| Notched IZOD | 23° C., 5 lbf/ft | ASTM D256 | J/m | 196 | 154 | 156 |
| Ductility | 23° C., 5 lbf/ft | ASTM D256 | % | 100 | 0 | 100 |
| Notched IZOD | −20° C., 5 lbf/ft | ASTM D256 | J/m | 107 | 66 | |
| HDT | 1.82 MPa/3.2 mm | ASTM D648 | ° C. | 156 | 145 | 147 |
| Flexural Modulus | 3.2 mm, 1.27 mm/min | ASTM D790 | MPa | 2190 | 2380 | 2610 |
| Flexural Strength | break, 3.2 mm, 1.27 mm/min | ASTM D790 | MPa | 84 | 90 | 92 |
| Tensile Modulus | 50 mm/min | ASTM D638 | MPa | 2367 | 2579 | 2768 |
| Tensile Strength | yield, 50 mm/min | ASTM D638 | MPa | 52 | 51 | 59 |
| Tensile Elongation | break, 50 mm/min | ASTM D638 | % | 18.7 | 11.9 | 27.3 |
| Dk | 1.1 GHz | In-house method* | | 3.01 | 3.00 | 3.31 |
| Df | 1.1 GHz | In-house method* | | 1.04e−3 | 8.9e−4 | 8.7e−4 |

*As described above in connection with Table 4.

As shown in Table 8, when HIPS was replaced by GPPS, the Dk values were nearly unchanged, but Df values decreased to about or less than 0.001 (E2.1 to E2.3). Taking the compositions having a Dk value of ~3.0 as an example (C2.1 and E2.1), it can be observed that Df decreased from 0.00114 to 0.00104 when GPPS was used as the flow promoter. As the GPPS ratio in the formulation becomes higher (i.e., PPO ratio lowered), Df was further reduced to lower than 0.00089 (see E2.2). Although it was expected that the use of GPPS would result in a decrease in impact strength, impact strength and ductility were actually improved by increasing the ratio of impact modifier (SEBS). Furthermore, it was observed that when GPPS and SEBS were used as the flow promoter and impact modifier, respectively, better impact strength and lower Df value resulted (see E2.3) as compared with using only HIPS (C2.2).

Table 9, below, lists additional control and experimental compositions. The experimental compositions (E3.1 to E3.3) included lower molecular weight SEBS (better flowability, ~5 g/10 min at 230° C./5 kg), which the inventors surmised could disperse better in the resin matrix during the compounding process. The control formulas (C3.1 to C3.3) included SEBS with low flowability (<1 g/10 min at 230° C./5 kg). The total amount of the poly(arylene ether), polystyrene, and impact modifier components is set to 100% by weight, and the filler component is expressed in percentage by weight relative to 100 parts by weight of the poly(arylene ether), polystyrene, and impact modifier components.

TABLE 9

| Item Code | Item Description | C3.1 | C3.2 | C3.3 | E3.1 | E3.2 | E3.3 |
|---|---|---|---|---|---|---|---|
| C2020 | PPO, .40IV, LOW ODOR | 74.2 | 74.1 | 73.4 | 74.2 | 74.1 | 73.4 |
| F5230 | Low Mw SEBS IMPACT MODIFIER | 12.3 | 12.3 | 12.5 | | | |
| G1652-J | S(EB)S rubber | | | | 12.3 | 12.3 | 12.5 |
| L3190 | PS HIPS | 13.5 | 13.6 | 14.1 | 13.5 | 13.6 | 14.1 |
| R10834 | Bright White TiO2 PIGMENT | 21 | 34 | 54 | 21 | 34 | 54 |
| F00873 | MAG OXIDE | 0.1 | 0.1 | 0.1 | 0.1 | 0.1 | 0.1 |
| F112 | ZINC SULFIDE | 0.1 | 0.1 | 0.1 | 0.1 | 0.1 | 0.1 |
| F5330 | TDP ANTI-OXIDE | 0.4 | 0.4 | 0.4 | 0.4 | 0.4 | 0.4 |
| ACE-PE | LDPE | 1 | 1 | 1 | 1 | 1 | 1 |

Physical and electrical properties of the tested control compositions are listed in Table 10, below, and properties of the experimental compositions are listed in Table 11.

TABLE 10

| Typical Property | Test Method | Test Description | Unit | C3.1 | C3.2 | C3.3 |
|---|---|---|---|---|---|---|
| MVR | 300° C./5 kg/360 s | ASTM D1238 | cm³/10 min | 7.3 | 6.5 | 5.0 |
| Notched IZOD | 23° C., 5 lbf/ft | ASTM D256 | J/m | 293 | 255 | 186 |
| Ductility | 23° C., 5 lbf/ft | ASTM D256 | % | 100 | 100 | 100 |
| Notched IZOD | −20° C., 5 lbf/ft | ASTM D256 | J/m | 198 | 170 | 162 |
| Notched IZOD | 23° C., 5.5 J | ISO 180 | kJ/m² | 22.4 | 19.1 | 15.5 |
| Ductility | 23° C., 5.5 J | ISO 180 | % | 100 | 100 | 100 |
| Notched IZOD | −20° C., 5.5 J | ISO 180 | kJ/m² | 14.9 | 15.6 | 14.8 |
| HDT | 1.82 MPa/3.2 mm | ASTM D648 | ° C. | 151 | 153 | 155 |
| Flexural | 3.2 mm, | ASTM D790 | MPa | 1980 | 2100 | 2290 |

TABLE 10-continued

| Typical Property | Test Method | Test Description | Unit | C3.1 | C3.2 | C3.3 |
|---|---|---|---|---|---|---|
| Modulus | 1.27 mm/min | | | | | |
| Flexural Strength | break, 3.2 mm, 1.27 mm/min | ASTM D790 | MPa | 79 | 79 | 79 |
| Tensile Modulus | 50 mm/min | ASTM D638 | MPa | 2121 | 2287 | 2492 |
| Tensile Strength | yield, 50 mm/min | ASTM D638 | MPa | 52 | 52 | 52 |
| Tensile Elongation | break, 50 mm/min | ASTM D638 | % | 26.5 | 17.9 | 11.3 |
| Dk | 1.1 GHz | In-house method* | | 3.00 | 3.29 | 3.76 |
| Df | 1.1 GHz | In-house method* | | 1.1e−3 | 1.2e−3 | 1.2e−3 |

*As described above in connection with Table 4.

TABLE 11

| Typical Property | Test Method | Test Description | Unit | E3.1 | E3.2 | E3.3 |
|---|---|---|---|---|---|---|
| MVR | 300° C./5 kg/360 s | ASTM D1238 | cm³/10 min | 10.6 | 9.3 | 6.3 |
| Notched IZOD | 23° C., 5 lbf/ft | ASTM D256 | J/m | 883 | 428 | 208 |
| Ductility | 23° C., 5 lbf/ft | ASTM D256 | % | 100 | 100 | 100 |
| Notched IZOD | −20° C., 5 lbf/ft | ASTM D256 | J/m | 234 | 195 | 188 |
| Notched IZOD | 23° C., 5.5 J | ISO 180 | kJ/m² | 106 | 38.7 | 18.5 |
| Ductility | 23° C., 5.5 J | ISO 180 | % | 100 | 100 | 100 |
| Notched IZOD | −20° C., 5.5 J | ISO 180 | kJ/m² | 21.1 | 17.5 | 17 |
| HDT | 1.82 MPa/3.2 mm | ASTM D648 | ° C. | 142 | 145 | 149 |
| Flexural Modulus | 3.2 mm, 1.27 mm/min | ASTM D790 | MPa | 1700 | 1860 | 2100 |
| Flexural Strength | break, 3.2 mm, 1.27 mm/min | ASTM D790 | MPa | 71 | 73 | 73 |
| Tensile Modulus | 50 mm/min | ASTM D638 | MPa | 1843 | 2008 | 2262 |
| Tensile Strength | yield, 50 mm/min | ASTM D638 | MPa | 48 | 48 | 47 |
| Tensile Elongation | break, 50 mm/min | ASTM D638 | % | 21.6 | 16.5 | 9.1 |
| Dk | 1.1 GHz | In-house method* | | 3.00 | 3.29 | 3.78 |
| Df | 1.1 GHz | In-house method* | | 1.2e−3 | 1.2e−3 | 1.2e−3 |

*As described above in connection with Table 4.

As shown in Table 11, when lower molecular weight, higher flow SEBS was used as the impact modifier, the impact performance of compositions with various Dk values was greatly improved (see E3.1 to E3.3). For example, in compositions having a Dk value of around 3 (C3.1 and E3.1), the use of low Mw SEBS induced a rapid increase of notched Izod impact rating, from 293 J/m (C3.1) to 883 J/m (E3.1), the latter being comparable to the impact performance of polycarbonate. Besides superior high impact performance, improved flowability and low Df were obtained as well.

What is claimed:

1. A resin composition comprising:
   (a) 40-90% by weight of a poly(arylene ether);
   (b) 0-40% by weight of high-impact polystyrene (HIPS) and 0-40% by weight of general-purpose polystyrene (GPPS), provided that the HIPS, the GPPS, or the combination thereof represents 5-40% by weight of said composition;
   (c) 5-25% by weight of an impact modifier; and,
   (d) 15-400% by weight of a ceramic filler, as measured per 100 parts by weight of components (a)-(c),
   wherein components (a)-(c) are each expressed relative to the total weight of components (a)-(c), and
   wherein the resin composition exhibits a Df value of 8.7 e−4 to 1.2 e−3 when evaluated at 1.1 GHz using a split post dielectric resonator on a minimum sample size of 120 millimeter (mm) by 120 mm and a maximum sample thickness of 6 mm.

2. The resin composition according to claim 1 wherein the poly(arylene ether) is poly(p-phenylene oxide).

3. The resin composition according to claim 1 comprising about 50-75% by weight of the poly(arylene ether).

4. The resin composition according to claim 1 comprising no HIPS.

5. The resin composition according to claim 4 comprising 10-30% by weight of GPPS.

6. The resin composition according to claim 1 comprising no GPPS.

7. The resin composition according to claim 6 comprising 10-30% by weight of HIPS.

8. The resin composition according to claim 1 wherein said impact modifier is styrene ethylene butylene styrene (SEBS), poly(styrene-butadiene-styrene) (SBS), or styrene ethylene propylene styrene (SEPS), or a mixture thereof.

9. The resin composition according to claim 1 wherein said impact modifier is SEBS.

10. The resin composition according to claim 9 comprising high flow SEBS with a melt flow index that is greater than 3 g/10 min at 230° C./5 kg.

11. The resin composition according to claim 1 comprising 7-20% of the impact modifier.

12. The resin composition according to claim 1 comprising 20-200% by weight of a ceramic filler, as measured per 100 parts by weight of components (a)-(c).

13. The resin composition according to claim 1 wherein the ceramic filler is $TiO_2$, ZnS, $BaTiO_3$, or $CaTiO_3$.

14. The resin composition according to claim 1 wherein the ceramic filler is $TiO_2$.

15. The resin composition according to claim 1, further comprising a flow modifier, reinforcing agent, antioxidant, heat stabilizer, light stabilizer, ultraviolet light stabilizer, ultraviolet absorbing additive, plasticizer, lubricant, release agent, antistatic agent, anti-fog agent, antimicrobial agent, chain extender, colorant, de-molding agents, flow promoter, flow modifier, surface effect additive, radiation stabilizer, flame retardant, anti-drip agent, or any combination thereof.

16. The resin composition according to claim 1, wherein said poly(arylene ether) has an intrinsic viscosity of 0.3-0.5 dL/g.

17. The resin composition according to claim 1, wherein said poly(arylene ether) has an intrinsic viscosity of 0.4-0.46 dL/g.

18. A plastic component formed from a composition that comprises
  (a) 40-90% by weight of a poly(arylene ether);
  (b) 0-40% by weight of high-impact polystyrene (HIPS) and 0-40% by weight of general-purpose polystyrene (GPPS), provided that the HIPS, the GPPS, or the combination thereof represents 5-40% by weight of said composition;
  (c) 5-25% by weight of an impact modifier; and,
  (d) 15-400% by weight of a ceramic filler, as measured per 100 parts by weight of components (a)-(c),
  wherein components (a)-(c) are each expressed relative to the total weight of components (a)-(c), and
  wherein the composition exhibits a Df value of 8.7 e-4 to 1.2 e-3 when evaluated at 1.1 GHz using a split post dielectric resonator on a minimum sample size of 120 millimeter (mm) by 120 mm and a maximum sample thickness of 6 mm.

19. A method of making a plastic component comprising:
extruding a resin composition comprising:
  (a) 40-90% by weight of a poly(arylene ether);
  (b) 0-40% by weight of high-impact polystyrene (HIPS) and 0-40% by weight of general-purpose polystyrene (GPPS), provided that the HIPS, the GPPS, or the combination thereof represents 5-40% by weight of said composition;
  (c) 5-25% by weight of an impact modifier; and,
  (d) 15-400% by weight of a ceramic filler, as measured per 100 parts by weight of components (a)-(c),
  wherein components (a)-(c) are each expressed relative to the total weight of components (a)-(c);
and,
molding the extruded composition to form the component,
wherein the extruded composition exhibits a Df value of 8.7 e-4 to 1.2 e-3 when evaluated at 1.1 GHz using a split post dielectric resonator on a minimum sample size of 120 millimeter (mm) by 120 mm and a maximum sample thickness of 6 mm.

* * * * *